US006947355B2

(12) United States Patent
Hong et al.

(10) Patent No.: US 6,947,355 B2
(45) Date of Patent: Sep. 20, 2005

(54) OPTICAL DISK DRIVE HAVING FUNCTION OF REMOVING STATIC ELECTRICITY OF OPTICAL DISK

(75) Inventors: Soon-kyo Hong, Seoul (KR); Cheol-woong Ahn, Seoul (KR); Myung-ryul Choi, Seoul (KR); Jae-won Ha, Gyeonggi-do (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 101 days.

(21) Appl. No.: 10/418,117

(22) Filed: Apr. 18, 2003

(65) Prior Publication Data

US 2003/0231560 A1 Dec. 18, 2003

(30) Foreign Application Priority Data

Jun. 18, 2002 (KR) ........................................ 2002-34135

(51) Int. Cl.[7] ................................................ G11B 21/08

(52) U.S. Cl. ............................... 369/30.27; 369/30.36; 720/601; 720/650

(58) Field of Search ............................... 369/75.1, 75.2, 369/77.1, 77.2, 30.36, 30.27, 14, 33.01, 53.3, 47.39, 47.55; 720/601, 619, 626, 637, 622, 639, 650, 737

(56) References Cited

U.S. PATENT DOCUMENTS 5,684,775 A * 11/1997 Tanaka et al. .............. 720/650
5,864,447 A * 1/1999 Matsumoto et al. ..... 360/265.1
6,594,110 B2 * 7/2003 Kimura et al. .............. 720/650
6,603,723 B2 * 8/2003 Minase ....................... 720/673

FOREIGN PATENT DOCUMENTS

JP 4-325985 11/1992
JP 6-302080 10/1994
JP 11-45493 * 2/1999 .............. 369/30.36

* cited by examiner

*Primary Examiner*—Tan Dinh
(74) *Attorney, Agent, or Firm*—Staas & Halsey LLP

(57) ABSTRACT

An optical disk drive includes a case, a tray which is slidably provided to the case and receives an optical disk, and a ground member which is electrically connected to the case and contacts one side of the optical disk as the tray slides in or out of the case. In the optical disk drive, by removing a static electricity remaining on the optical disk through the ground member, where the tray is loaded, foreign materials such as dust can be prevented from adhering to the optical disk. Accordingly, a stable and accurate optical signal processing can be guaranteed, thereby improving the reliability of the optical disk drive and the optical disk.

17 Claims, 9 Drawing Sheets

OPTICAL DISK DRIVE HAVING FUNCTION OF REMOVING STATIC ELECTRICITY OF OPTICAL DISK

CROSS-REFERENCE TO RELATED APPLICATIONS

This application claims the benefit of Korean Patent Application No. 2002-34135 filed Jun. 18, 2002 in the Korean Intellectual Property Office, the disclosure of which is incorporated herein in its entirety by reference.

BACKGROUND OF THE INVENTION

1. Field of the Invention

The present invention relates to an optical disk drive, and more particularly, to an optical disk drive which removes a static electricity of an optical disk.

2. Description of the Related Art

FIGS. 1–3 show a conventional optical disk drive adopted in a portable information processor such as a notebook computer. The optical disk drive includes a case 10 which is installed in a main body (not shown) of the information processor and a try 20 which is slidably installed in the case 10. Various circuit boards 11 are installed on the case 10. The tray 20 includes a turntable 21 which accommodates an optical disk D and an optical pickup 22 which accesses the optical disk D to exchange optical signals.

Where the tray 20 slides in the case 10, the tray 20 is locked as a hook step 20*a* formed on a bottom surface of the tray 20 is hooked by a hook portion 13*a* of a rotary lever 13 connected to a solenoid 12. Thus, where the optical disk D is placed on the turntable 21 and the tray 20 is pushed into the case 10, as shown in FIG. 2, the hook step 20*a* and the hook portion 13*a* are locked together so as to stably record or reproduce information on or from the optical disk D.

Where the tray 20 is ejected from the case 10, the solenoid 12 is driven to rotate the rotary lever 13 in a direction in which the hook step 20*a* is unlocked from the hook portion 13*a*. A spring 23 is provided on a lower surface of the tray 20. The spring 23 is elastically deformed where the tray 20 slides in, and is elastically returned to the original state and pushes the tray 20 outside the case 10 where the hook portion 13*a* disengages with the hook step 20*a*. That is, the tray 20 is ejected by a restoring force of the spring 23.

Reference 30 denotes a disk stopper that provides a braking force to the tray 20, so as to prevent the tray 20 from being ejected beyond a predetermined distance, as the disk stopper 30 makes a frictional contact with an edge of the optical disk D, as shown in FIG. 3. Where the tray 20 slides into the case 10, the edge of the optical disk D contacts the disk stopper 30. Since the braking force is generated due to the frictional contact, the tray 20 can be pushed into the case 10 with a small amount of force. The disk stopper 30 is made of a material such as a rubber, a plastic, a vinyl, a cloth, and a leather.

Where the optical disk D rotates at a high speed in the optical disk driver having the above structure, a static electricity may be generated on a surface of the optical disk D due to a friction with air. Where the static electricity is generated on the surface of the optical disk D, the static electricity attracts a foreign material such as dust so that the surface of the optical disk D is easily contaminated by the foreign material. As a result, the foreign material may hinder a recording or a reproducing operation with respect to the optical disk D. Where the amount of the static electricity is small, it may not adversely affect the optical disk D. However, as the optical disk D is repeatedly used, the static electricity is accumulated and a degree of dust attachment is increased. In this case, a recording and/or a reproduction operation may be adversely affected by the foreign material.

SUMMARY OF THE INVENTION

Accordingly, it is an aspect of the present invention to provide an optical disk drive which removes a static electricity of an optical disk, before use.

Additional objects and advantages of the invention will be set forth in part in the description which follows and, in part, will be obvious from the description, or may be learned by practice of the invention.

To achieve the above and/or other aspects of the present invention, there is provided an optical disk drive for driving an optical disk, comprising a case, a tray which receives the optical disk and slides in and out of the case, and a ground member which is electrically connected to the case and contacts one side of the optical disk in response to the tray sliding in or out of the case.

The ground member may provide a braking force to stop the optical disk as the optical disk comes into a frictional contact with the ground member, where the tray is ejected from the case.

The ground member may comprise a combination of a metal material which provides an electrical connection with the case and a non metal material which provides the braking force.

The metal material may include at least one selected from aluminum, silver, copper, nickel, stainless steel, a conductive material in which a metal powder and carbon are mixed with a synthetic resin and a synthetic rubber, a metal thread, and a material in which a metal tread and a non metal thread are mixed. The metal material may be an attachment metal tape.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
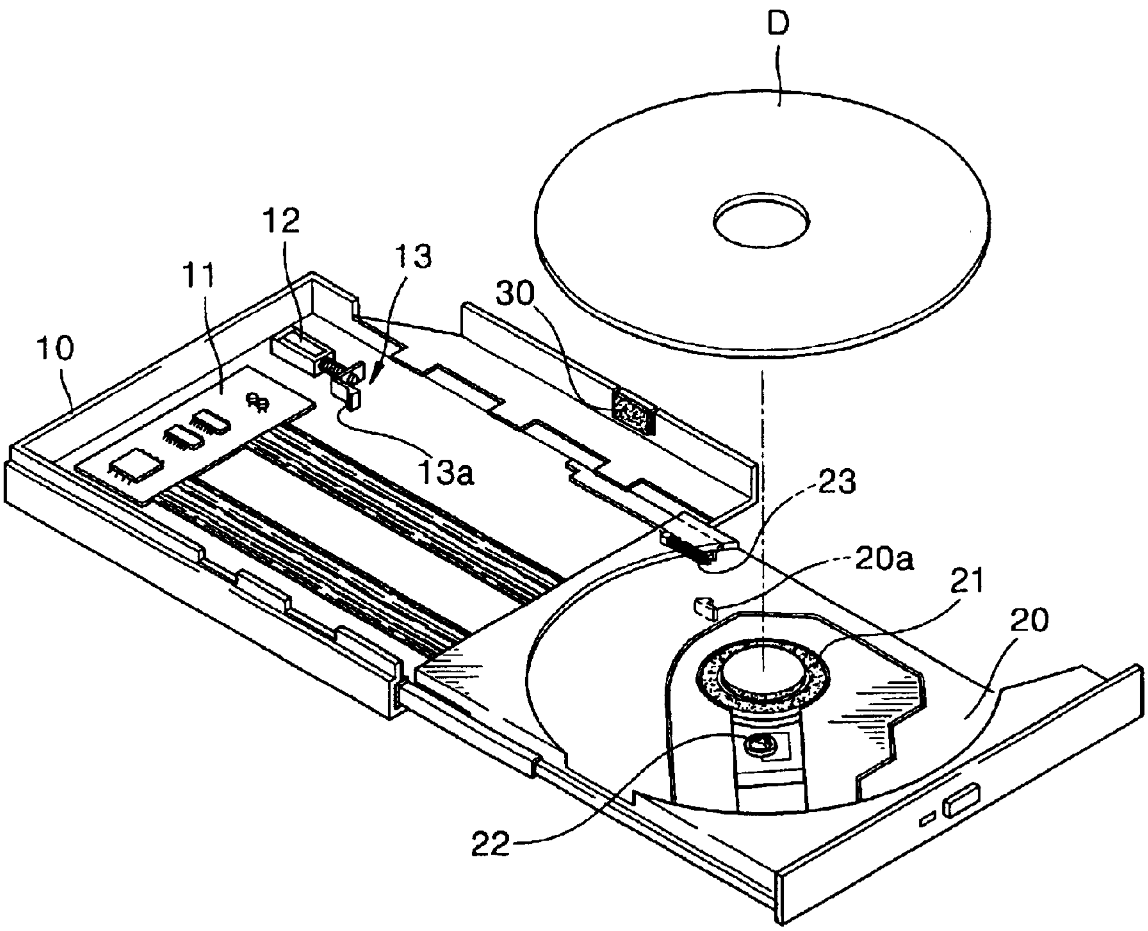
FIG. 1 is a perspective view of a conventional optical disk drive.
Figure 2:
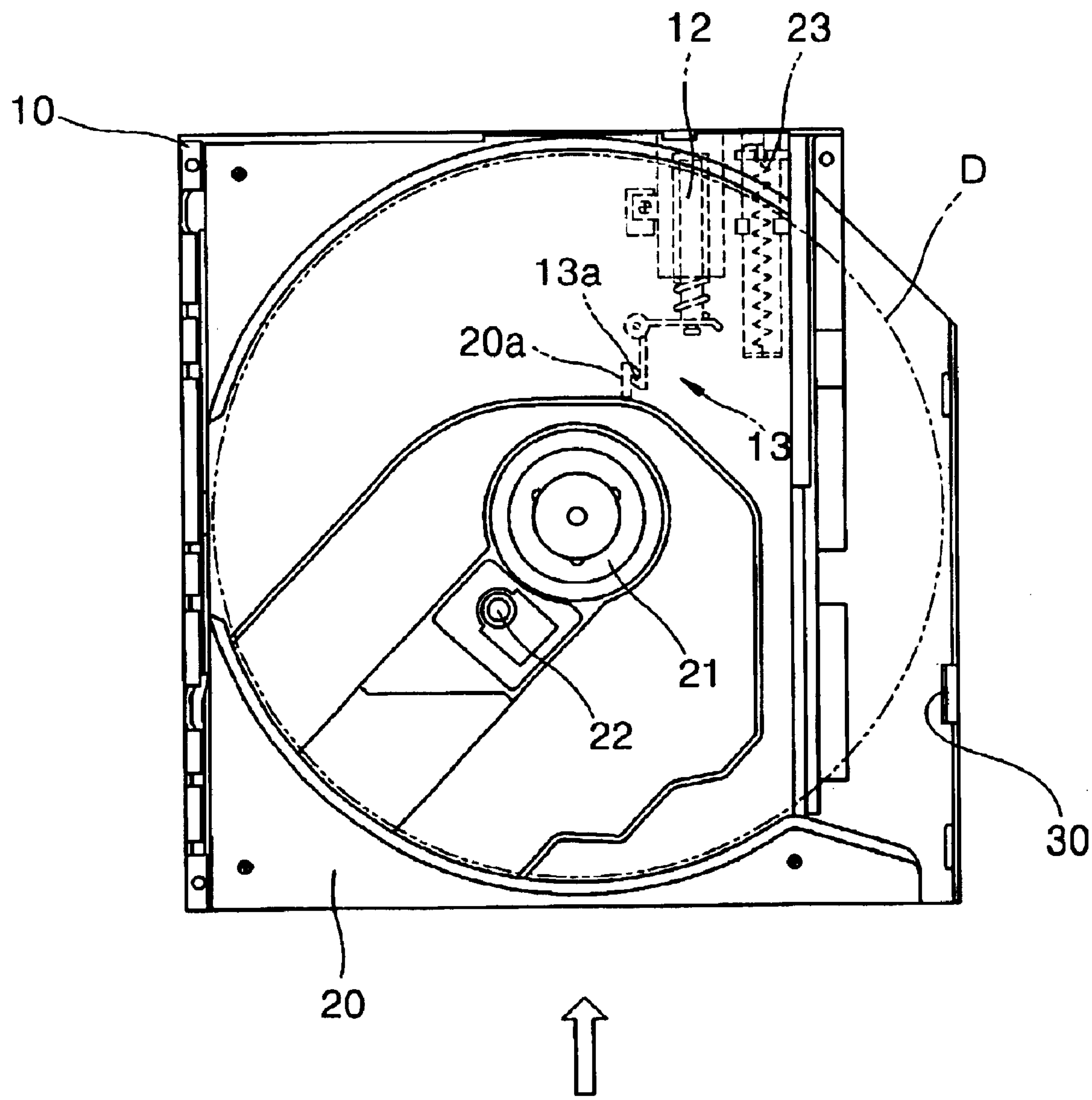
FIGS. 2 and 3 are plane views illustrating a tray loaded in and unloaded from the optical disk drive shown in FIG. 1, respectively.
Figure 3:
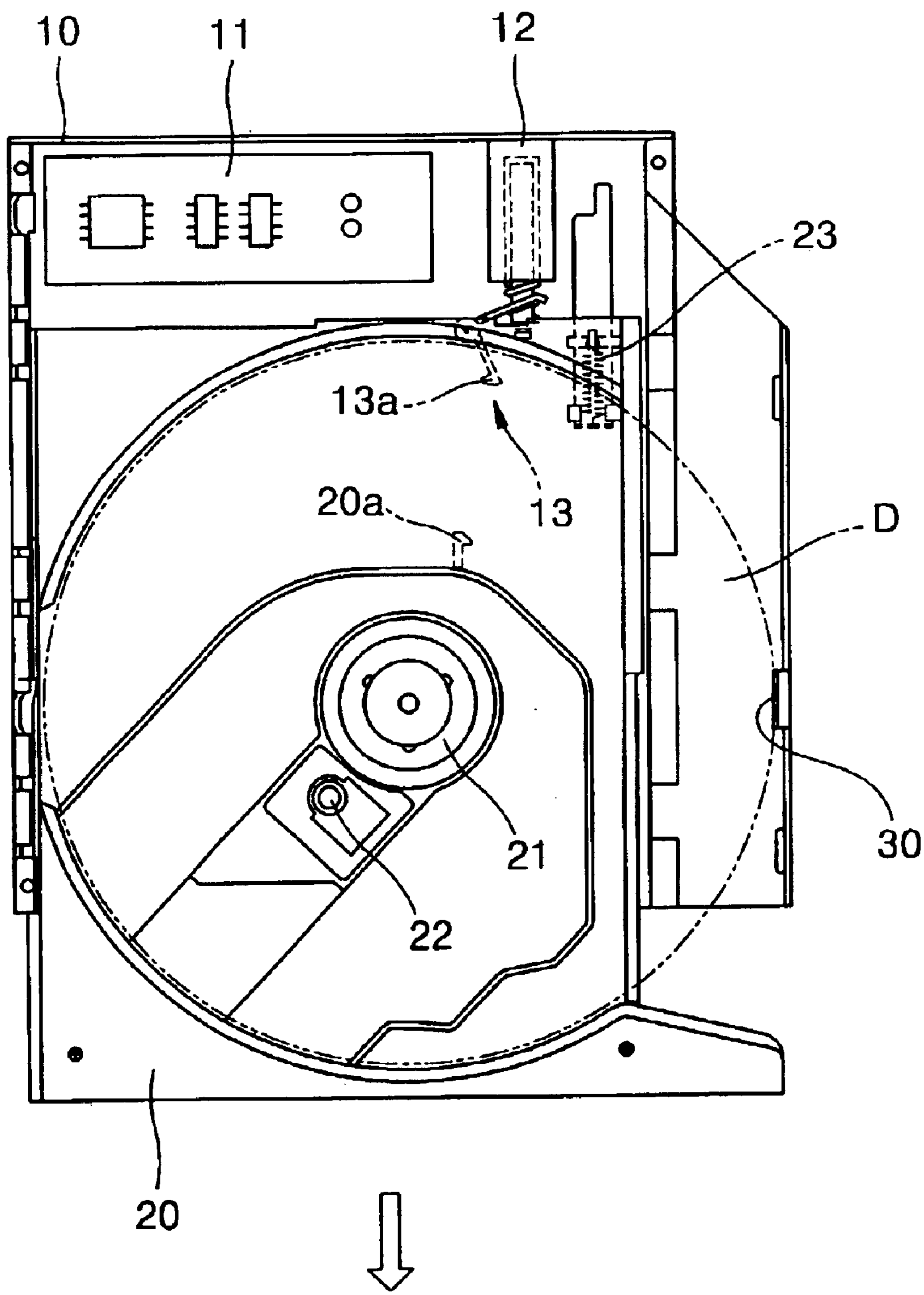

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
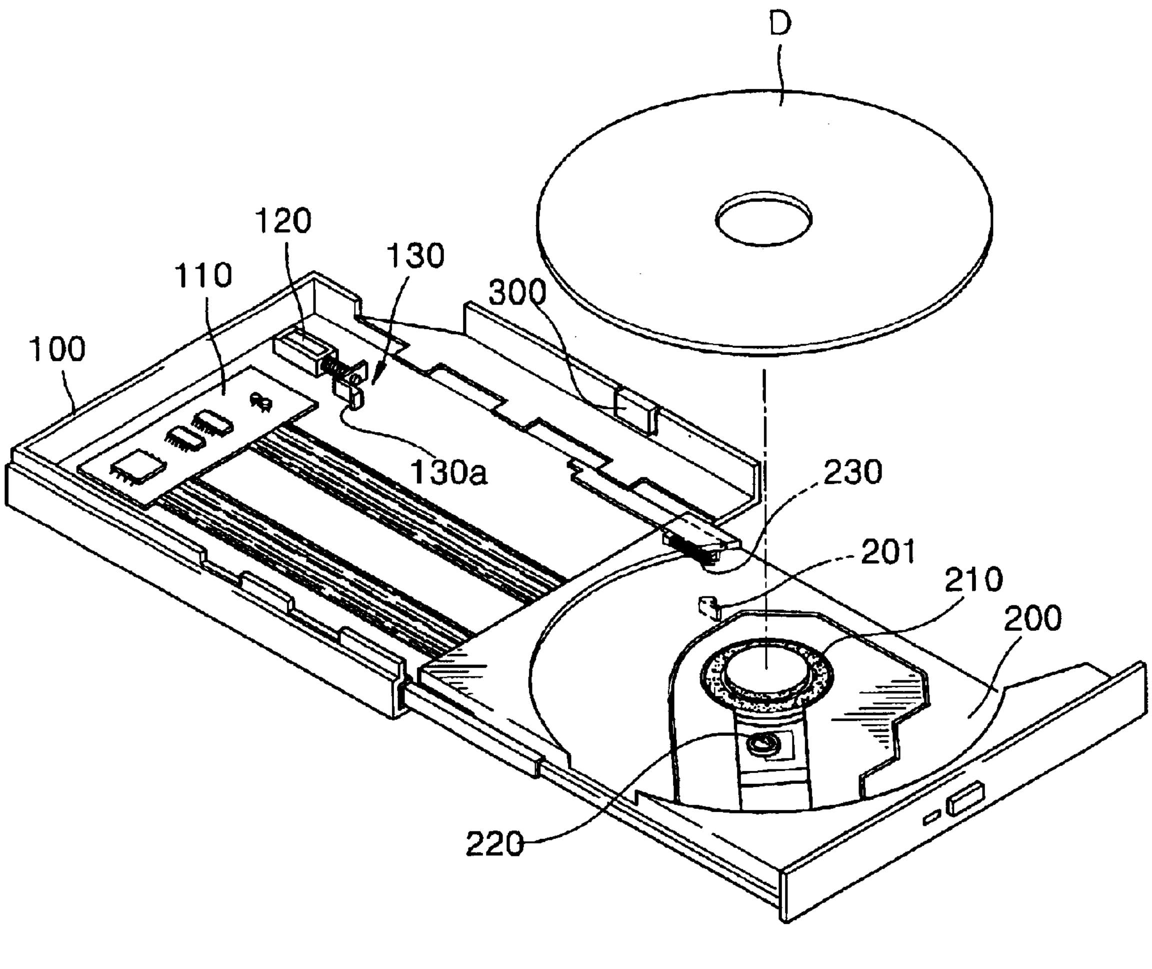
FIG. 4 is a perspective view of an optical disk drive according to an embodiment of the present invention.

FIG. 4 shows an optical disk drive according to an embodiment of the present invention. The optical disk drive includes a case 100 and a tray 200. The tray 200 is installed so as to slide in and out of the case 100, and includes a turntable 210 which accommodates an optical disk D and an optical pickup 220 which accesses the optical disk D to exchange optical signals.

Where the tray 200 slides into the case 100, the tray 200 is locked as a hook step 201 formed on a bottom surface of the tray 200 is hooked by a hook portion 131 of a rotary lever 130 connected to a solenoid 120. Where the tray 200 is ejected from the case 100, the solenoid 120 is driven to rotate the rotary lever 130 in a direction to unlock the hook step 201 from the hook portion 131. The tray 200 is ejected out of the case 100 by a restoring force of a spring 230 installed on a lower surface of the tray 200.

Reference 300 denotes a disk stopper which provides a braking force to the tray 200 to prevent the tray 200 from being ejected beyond a predetermined distance by the restoring force, as the disk stopper 300 contacts an edge of the optical disk D. In the present invention, the disk stopper 300 also functions as a ground member. That is, since the edge of the optical disk D contacts the disk stopper 300, where the tray 200 slides in, a static electricity of the optical disk D can be removed by providing a ground function to the disk stopper 300. Accordingly, at least a part of the disk stopper 300 is made of a metal so as to be electrically connected to the case 100. In other words, since the case 100 is typically made of a metal material such as aluminum or stainless steel and the disk stopper 300 is installed on the case 100, by making at least a part of the disk stopper 300 out of a conductive metal material, the static electricity of the optical disk D is grounded to the case 100 as the edge of the optical disk D contacts the disk stopper 300.

Figure 5A:
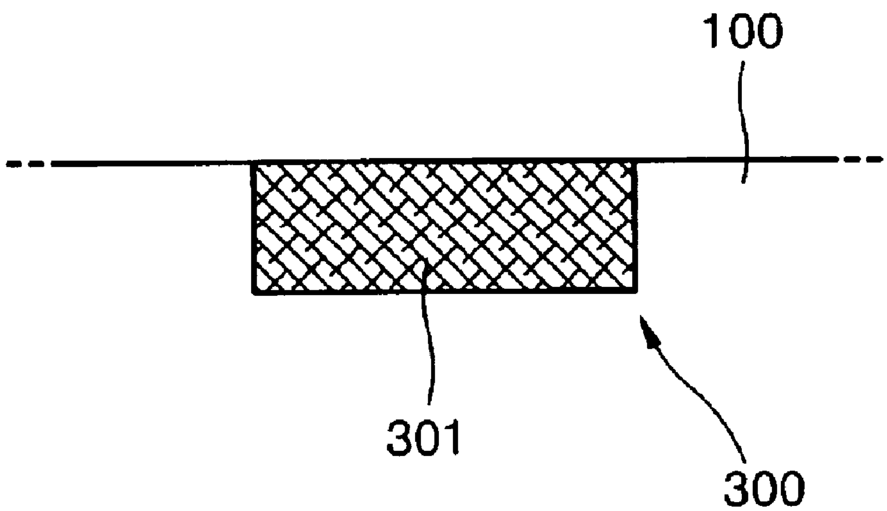
FIGS. 5A through 5D are plan views illustrating modified examples of a stopper and ground member shown in FIG. 4.
Figure 5B:
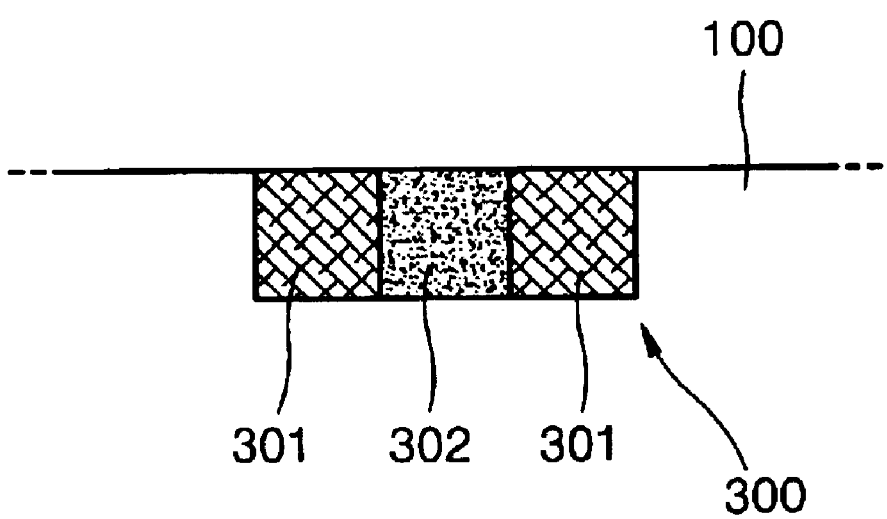
Figure 5C:
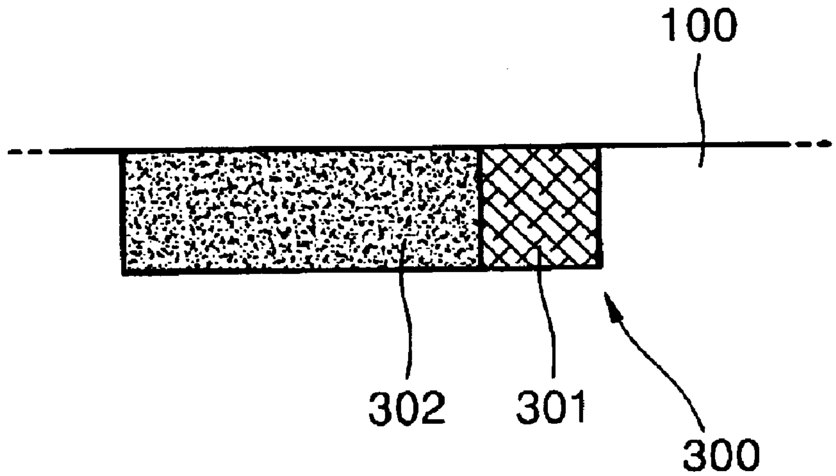
Figure 5D:
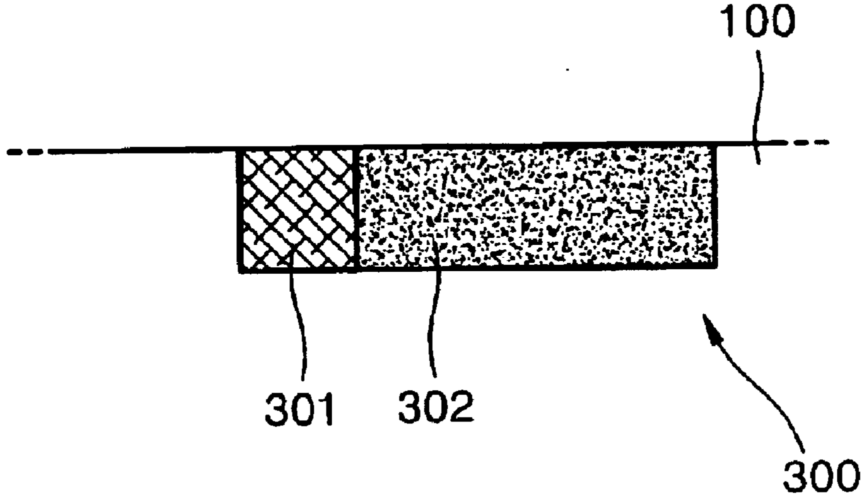

FIGS. 5A–5D show various configurations of the disk stopper 300. As shown in FIG. 5A, the entire portion of the disk stopper 300 can be made of a metal material 301 for a grounding function. On the other hand, as shown in FIGS. 5B–5D, a metal material 301 which grounds the optical disk D can be arranged at both sides, a left side or a right side of the disk stopper 300 while a non metal material 302, for example, a rubber or a leather, is arranged at the remaining portion. Since the disk stopper 300 has a dual function to stop and ground the optical disk D, a rubber or a leather exhibiting a relatively high braking performance may be used to enhance the stopping function. Here, aluminum may be used for the case 100, and silver, copper, nickel, or any stainless steel material can be used for the metal material 301. Also, a conductive material, in which a metal powder exhibiting superior conductivity and carbon are mixed with a synthetic rubber and a synthetic resin, for example, epoxy resin, acryl resin, and deformed urethane resin, may be used for a metal material 301. Additionally, a metal thread, or a material in which a metal thread and a non metal thread are mixed can be used for the metal material 301. Furthermore, a simple metal tape attachment can be utilized as the metal material 301.

Figure 6:
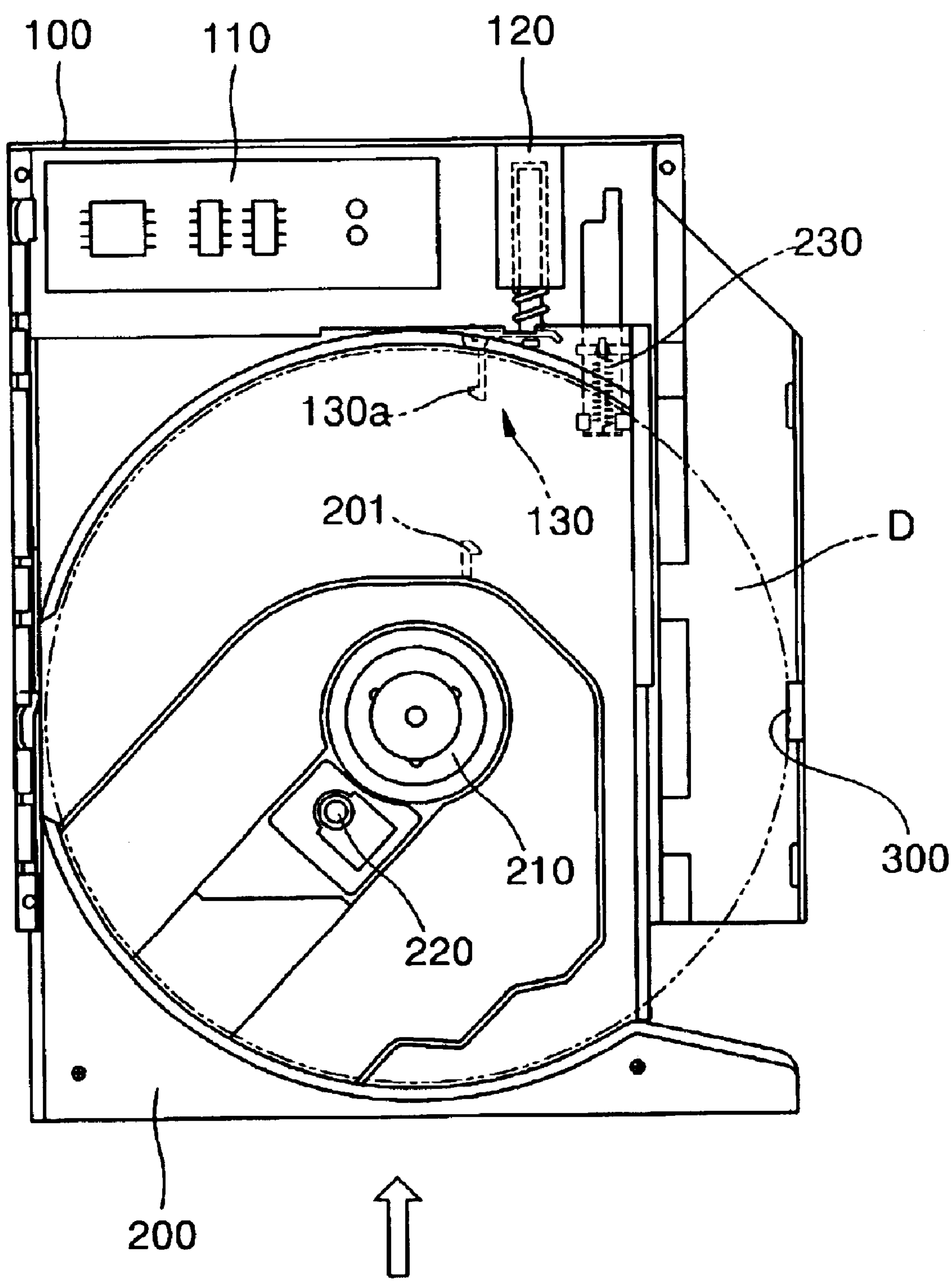
FIGS. 6 and 7 are plan views illustrating a tray loaded inland unloaded from the optical disk drive shown in FIG. 4, respectively.
Figure 7:
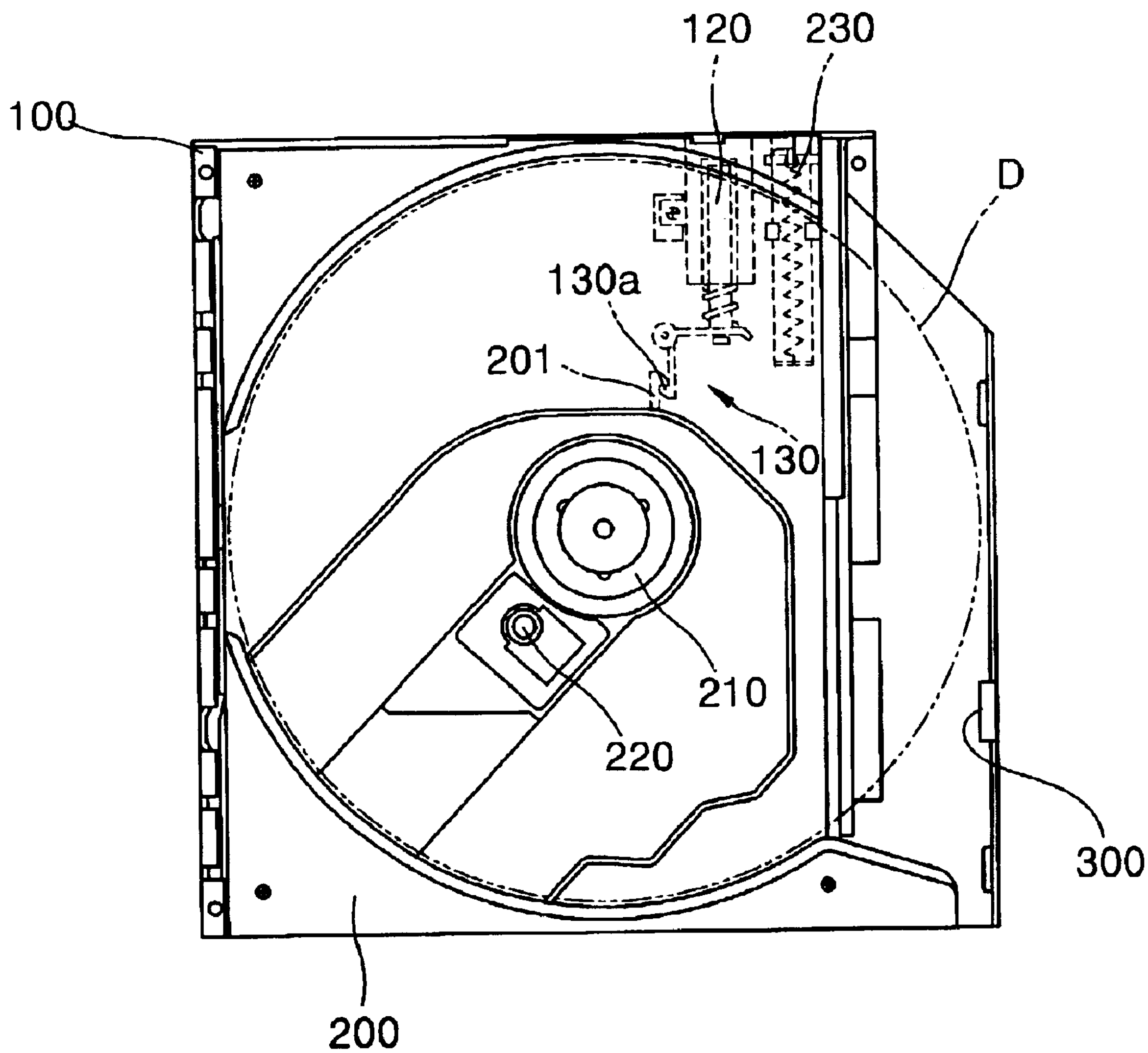

In an optical disk drive having the above structure, where the optical disk D is placed on the turntable 210 of the tray 200 and the tray 200 is pushed into the case 100, as shown in FIG. 6, the edge of the optical disk D proceeds while it contacts the disk stopper 300, which is a ground member as well. At this point, the optical disk D, the disk stopper 300, and the case 100 are electrically connected to one another and a static electricity remaining on the optical disk D is transferred toward the case 100. Where the tray 200 is completely loaded in the case 100, as shown in FIG. 7, the static electricity is removed from the optical disk D so as to prevent foreign materials, for example, dust, from adhering to the optical disk D due to the static electricity. Accordingly, a possibility of an optical signal process being hindered by the attachment of the foreign materials is drastically reduced during subsequent information recording and/or reproducing operations thereof.

Figure 8:
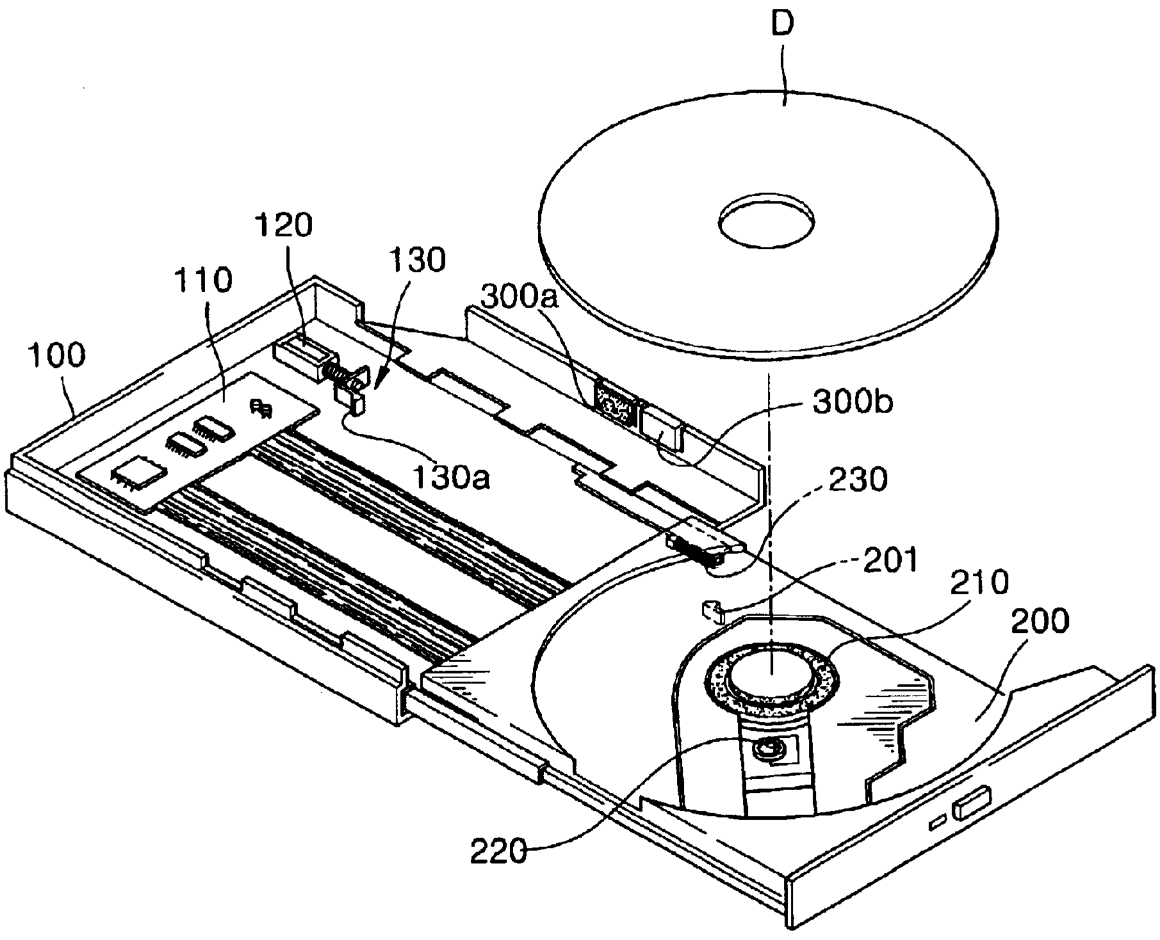
FIG. 8 is a perspective view of an optical disk drive according to another embodiment of the present invention.

FIG. 8 shows an optical disk drive according to another embodiment of the present invention. That is, while the disk stopper 300 of FIG. 4 is configured to have a function of a ground member as well as a function of a stopping member to simplify the structure thereof, a separate ground member 300*b* can be installed, for example, next to a disk stopper 300*a* so as to perform the respective grounding and stopping functions independently.

As described above, in an optical disk drive according to the present invention, by removing a static electricity remaining on an optical disk through a predetermined ground member, where a tray is loaded into the optical disk drive, foreign materials such as dust can be prevented from adhering to the optical disk. Thus, a stable and an accurate optical signal processing is guaranteed and the reliability of the optical disk drive and the optical disk is improved.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An optical disk drive for driving an optical disk, comprising:

a case;

a tray which receives the optical disk and slides in and out of the case; and a ground member which is electrically connected to the case and contacts a side of the optical disk in response to the tray sliding in or out of the case, wherein the ground member provides a braking force to stop the optical disk as the optical disk comes into a frictional contact with the ground member, where the tray is ejected from the case.

2. The optical disk drive as claimed in claim 1, wherein the ground member comprises a combination of a metal material which provides an electrical connection with the case, and a non metal material which provides the braking force.

3. The optical disk drive as claimed in claim 2, wherein the metal material includes at least one selected from aluminum, silver, copper, nickel, stainless steel, a conductive material in which a metal powder and carbon are mixed with a synthetic resin and a synthetic rubber, a metal thread, and a material in which a metal thread and a non metal thread are mixed.

4. The optical disk drive as claimed in claim 3, wherein the metal material is an attachment metal tape.

5. The optical disk drive as claimed in claim 1, wherein the optical disk drive removes a static electricity of the optical disk as the optical disk slides into the case.

6. The optical disk drive as claimed in claim 1, wherein the ground member further comprises a disk stopper which is provided to the case and provides the braking force to stop the optical disk as the optical disk comes into the frictional contact with the disk stopper, where the tray is ejected from the case.

7. The optical disk drive as claimed in claim 1, wherein the tray includes:

a turntable which accommodates the optical disk; and an optical pickup which reads and/or records an optical signal with respect to the optical disk.

8. The optical disk drive as claimed in claim 1, further comprising:

an elastic unit which provides a restoring force to eject the tray from the case;

a hook unit which is formed on a bottom of the tray;

a rotary lever having a hook portion which corresponds to the hook unit; and a solenoid unit which controls the rotary lever to disengage the hook portion from the hook unit so as to eject the tray from the case, wherein the hook portion engages with the hook unit as the tray slides into the case.

9. An optical disk drive for driving an optical disk, comprising:

a case;

a tray which receives the optical disk and slides in and out of the case; and a ground member which is electrically connected to the case and contacts a side of the optical disk in response to the tray sliding in or out of the case, wherein the ground member further comprises:

one or more grounding regions which ground the optical disk with respect to the case; and one or more stopping regions which provide a braking force to stop the optical disk as the optical disk comes into a frictional contact with the disk stopper, where the tray is ejected from the case.

10. The optical disk drive as claimed in claim 9, wherein one or more grounding regions and one or more stopping regions are alternately arranged.

11. The optical disk drive as claimed in claim 9, wherein one or more stopping regions are made of a rubber or leather.

12. The optical disk drive as claimed in claim 1, wherein the ground member grounds the optical disk with respect to the case so as to prevent a foreign material from clinging to the optical disk.

13. A disk drive for driving a storage medium, comprising:

a case;

a pickup which exchanges a signal with respect to the storage medium;

a tray which receives the storage medium and slides in and out of the case; and a ground member which is electrically connected to the case and removes a static electricity of the storage medium in response to the storage medium contacting the ground member, wherein the ground member provides a braking force to stop the storage medium as the storage medium comes into a frictional contact with the ground member, where the tray holding the storage medium is ejected from the case.

14. The disk drive as claimed in claim 13, wherein the ground member comprises a combination of a metal material which provides an electrical connection with the case, and a non metal material which provides the braking force.

15. The disk drive as claimed in claim 13, wherein the ground member further comprises a stopper which is provided to the case and provides the braking force to stop the storage medium as the storage medium comes into the frictional contact with the stopper, where the tray is ejected from the case.

16. The disk drive as claimed in claim 13, wherein the ground member grounds the storage medium with respect to the case so as to prevent a foreign material from clinging to the storage medium.

17. The disk drive as claimed in claim 13, wherein the storage medium is an optical disk.

* * * * *